United States Patent [19]

Ishida et al.

[11] Patent Number: 5,614,563
[45] Date of Patent: Mar. 25, 1997

[54] METHOD FOR THE PREPARATION OF SILICONE FOAM

[75] Inventors: Kouichi Ishida; Tsugio Nozoe, both of Chiba Prefecture, Japan

[73] Assignee: Dow Corning Toray Silicone Co., LTD., Tokyo, Japan

[21] Appl. No.: 672,207

[22] Filed: Jun. 27, 1996

[30] Foreign Application Priority Data

Jun. 27, 1995 [JP] Japan .................................. 7-183553

[51] Int. Cl.⁶ ..................................................... C08J 9/32
[52] U.S. Cl. ............................. 521/54; 521/154; 523/218; 523/219
[58] Field of Search ..................... 521/54, 154; 523/218, 523/219

[56] References Cited

U.S. PATENT DOCUMENTS

| | | | |
|---|---|---|---|
| 5,139,715 | 8/1992 | Katsuno et al. | 264/46.4 |
| 5,175,171 | 12/1992 | Shinmi et al. | 521/79 |
| 5,391,336 | 2/1995 | Akitomo et al. | 264/46.4 |

*Primary Examiner*—Morton Foelak
*Attorney, Agent, or Firm*—Robert L. McKellar

[57] ABSTRACT

A stable and highly productive method for the preparation of silicone foam having uniform cells characterized by mixing the base and curing agent portions of an organosiloxane, along with a gas-containing hollow filler in a mixing device having a shear-stirring mechanism such that the organosiloxane begins to foam and cure when the shear-stirring mechanism is used to rupture the filler and mix the base and curing agent portions.

3 Claims, 1 Drawing Sheet

METHOD FOR THE PREPARATION OF SILICONE FOAM

BACKGROUND OF THE INVENTION

1. Field of the Invention

This invention relates to a method for preparing silicone foams.

2. Description of the Prior Art

Organopolysiloxane compositions that cure while simultaneously foaming (hereinafter abbreviated as foaming/curing organopolysiloxane compositions) are well known and are used, for example as sealants for interpenetrating elements in nuclear power plants. These types of organopolysiloxane compositions are typically divided into two different fluids, a base and a curing agent, for storage. When the two parts are mixed, curing occurs accompanied by foaming based on the evolution of gaseous hydrogen to produce silicone foam.

Silicone foam gaskets that are formed at the particular sealing site from a foaming/curing organopolysiloxane composition have recently entered into use (Japanese Patent Application Laid Open (Kokai or Unexamined) Number Hei 3-94876 (94,876/1991)). These silicone foam gaskets are used in various applications, such as automotive headlamps and waterproof casings for holding automotive electronic components and the like. One problem with such Organopolysiloxane compositions is that they may not produce silicone foam gaskets having uniform cells when the two fluid parts are mixed in a closed or sealed system. A particular problem that occurs when the organopolysiloxane composition has a high viscosity is that the silicone foam obtained by foaming and curing the composition has irregular cells.

When this type of organopolysiloxane composition is used for the fabrication of foam gaskets, the composition is mixed in a mixer and extruded in bead form. Since the bead shape must be maintained after until foaming has begun, the composition must have a high viscosity, with the result, as discussed above, that the silicone foam gasket having uniform cells cannot be obtained.

Methods that solve the above-described problems have already been provided by the inventors in Japanese Patent Application Laid Open (Kokai or Unexamined) Numbers Hei 5-31814 (31,814/1993) and Hei 6-200066 (200,066/1994). These methods provide for the fabrication of silicone foam having uniform cells by quantitatively feeding the base, curing agent, and air into a special type of mixing device and mixing therein. These methods, however, are encumbered by several disadvantages from a production standpoint. Thus, they require the quantitative dosing of highly compressible air into the mixing device, which necessitates a special control device of complex structure. In addition, a very delicate control of the gas feed must be exercised in order to obtain silicone foam having uniform cells.

The inventors achieved the present invention as the result of extensive investigations directed to solving the problems described above.

In specific terms, the object of the present invention is to provide a highly productive method for the preparation of silicone foam having uniform cells.

SUMMARY OF THE INVENTION

The present invention relates to a method for the preparation of silicone foam, characterized by the fluid transport into a mixing device equipped with a shear-stirring mechanism and a discharge nozzle of both fluids of an organosiloxane composition comprising at least a base fluid and a curing agent fluid, wherein a gas-containing hollow filler is blended into either or both of said base and curing agent and wherein said organosiloxane composition will cure and simultaneously foam when the two fluids are mixed; by mixing the said base and curing agent while rupturing the said hollow filler—both through the action of the said shear-stirring mechanism—thereby releasing the gas enclosed within the hollow filler; and by thereafter extruding the resulting liquid mixture through the discharge nozzle for the development of foaming and curing.

Reference Numbers

Figure 1:
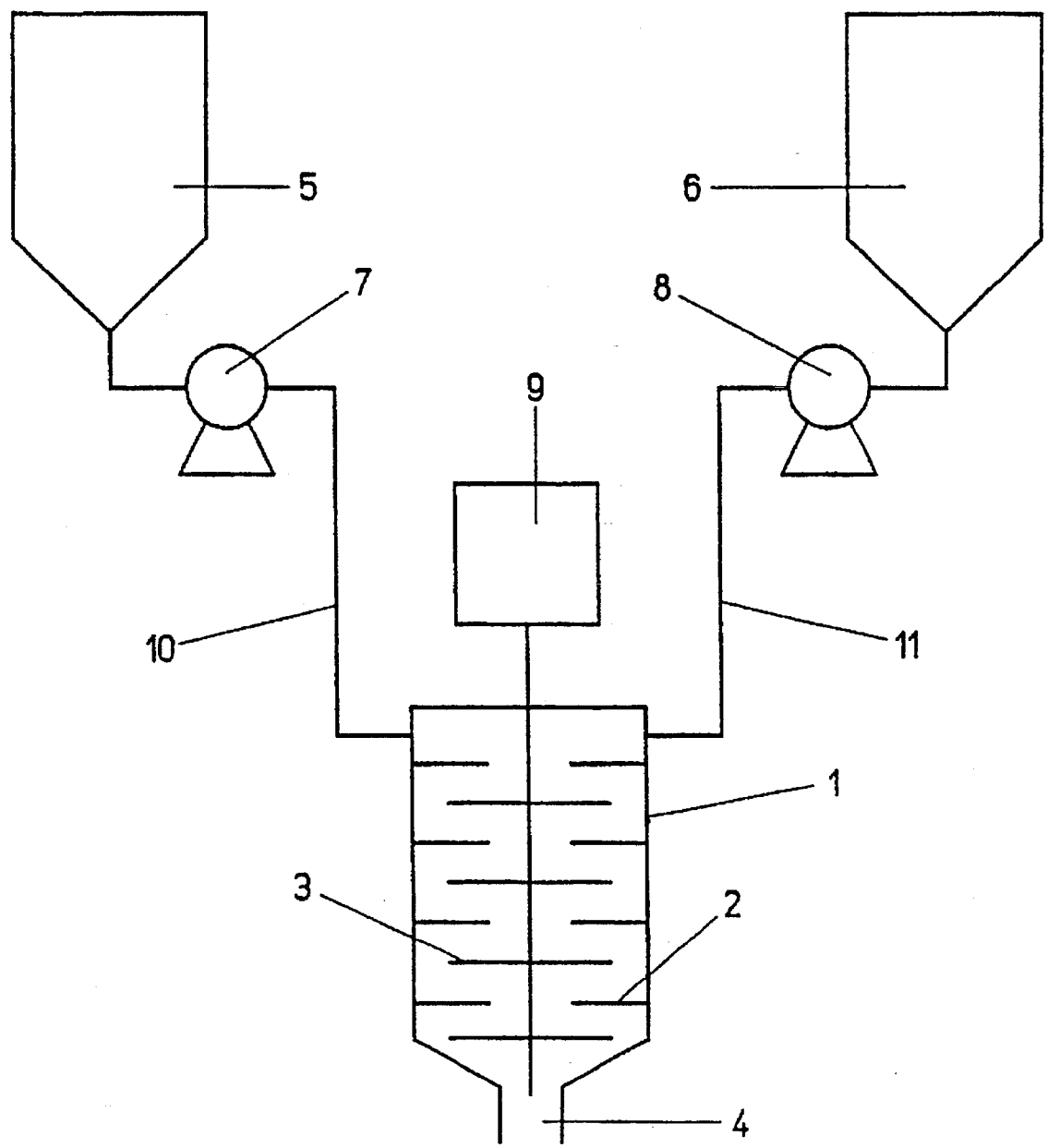
FIG. 1 contains one example of a device for the execution of the present invention.

1: mixing compartment
2: fixed blade
3: rotating blade
4: nozzle
5: storage tank
6: storage tank
7: pump
8: pump
9: motor The invention will be explained below with reference to the appended drawing. FIG. 1 contains a specific example of a device for the execution of the present invention. Here, 1 refers to a mixing compartment which is equipped with a shear-stirring mechanism comprising 2 types of mixing blades, i.e., comblike fixed blades 2 on the interior wall of the mixing compartment and rotating blades 3 that rotate while intermeshing with the former. The mixing compartment 1 is also equipped with a discharge nozzle 4 for mixture discharge. The use of a mixing device equipped with such a high-shear shear-stirring mechanism is preferred since the mixing compartment used by the present invention is intended to have a structure capable of rupturing the hollow filler in order to release the gas enclosed therein. The base and curing agent of the foaming/curing organopolysiloxane composition are separately stored in storage tanks 5 and 6, respectively, and are dosed out by pumps 7 and 8 and separately transported as liquids into mixing compartment 1. The base and curing agent fed into the said mixing compartment 1 are intermixed in the spaces between fixed blades 2 and rotating blades 3. At this point the outer shell or skin of the hollow filler is ruptured in the spaces between fixed blades 2 and rotating blades 3 and the gas enclosed within is released into the liquid mixture and dispersed therein to homogeneity. The liquid mixture is then discharged through the nozzle 4 at the bottom of the mixing compartment 1. The discharged mixture may be coated in bead form on the surface of the substrate that is to be sealed or it may be filled into a gap or space in an article or between articles. It is cured and foamed to yield silicone foam either by standing at room temperature or by heating.

DETAILED DESCRIPTION OF THE INVENTION

The present invention provides a method for preparing a silicone foam comprising the steps of I. transporting a base fluid and a curing agent fluid separately, in either or both which a gas-containing hollow filler is contained, into a mixing device equipped with a shear-stirring mechanism and a discharge nozzle; II. mixing the base fluid/hollow filler mixture and the curing agent fluid together in the mixing device to produce an organosiloxane composition, and simultaneously rupturing the hollow filler using the shear-stirring mechanism to release the gas contained in the hollow filler; III. extruding the organosiloxane composition through the discharge nozzle; and IV. allowing the base/curing agent mixture to foam and cure.

The foaming/curing organosiloxane composition used in the present invention is preferably an organosiloxane composition that cures with hydrogen acting as a blowing agent wherein the hydrogen is evolved by the condensation reaction between Si-bonded hydrogen and Si-bonded hydroxyl, e.g. silanol and the hydroxyl group in an alcohol or water. In a particularly preferred embodiment, this composition comprises (A) 100 parts by weight of an alkenyl-substituted organopolysiloxane having a viscosity, at 25° C., of 100 to 100,000 centistokes and containing an average of at least two silicon-bonded alkenyl groups per molecule;

(B) 0 to 100 parts by weight of a silanol-containing organopolysiloxane having an average of at least one silanol group per molecule;

(C) 1 to 20 part by weight of an alcohol;

(D) a catalytic quantity of a platinum catalyst;

(E) an organohydrogenpolysiloxane containing an average of at least two silicon-bonded hydrogen atoms per molecule, wherein the ratio of the number of moles of silicon-bonded hydrogen in (E) to the total of the number of moles of alkenyl in component (A) plus the number of moles of hydroxyl group in components (B) and (C) is 0.5:1 to 50:1; and (F) 5 to 50 parts by weight of a gas-containing hollow filler having an average particle size of from 5 to 1,000 micrometers.

To explain this preferred composition in greater detail, the organosiloxane (A) contains an average of at least two silicon-bonded alkenyl groups per molecule, with said alkenyl being exemplified by vinyl, allyl, hexenyl, and so forth. Its non-alkenyl silicon-bonded organic groups are exemplified by one or more substituted or unsubstituted monovalent hydrocarbon groups—excluding aliphatically unsaturated groups—selected from the $C_1$ to $C_6$ alkyl groups such as methyl, ethyl, propyl, butyl, and so forth; and groups such as phenyl, tolyl, and so forth; and groups in which all or part of the carbon-bonded hydrogen in the preceding groups has been replaced by a halogen atom or cyano group, e.g., chloromethyl, trifluoropropyl, cyanoethyl, and so forth. This organopolysiloxane will ordinarily have a linear molecular structure, but small amounts of branched or three dimensional organopolysiloxane may be present. This component should have a viscosity a 25° C. of 100 to 100,000 centistokes.

The organopolysiloxane (B) contains an average of at least one silanol group per molecule. This component cures with the evolution of hydrogen gas by reaction with the organohydrogenpolysiloxane (E) in the presence of the platinum catalyst (D). In addition to this role as blowing agent, organopolysiloxane (B) can also function as crosslinker when it contains at least 3 silanol groups.

The molecular structure of this organopolysiloxane may be linear, cyclic, or three-dimensional network. The silanol group may be present in molecular chain terminal position or along the molecular chain. Component (B) is added at 0 to 100 weight parts per 100 weight parts component (A).

The alcohol (C) is an organic compound that contains at least 1 carbon-bonded hydroxyl group. No particular restrictions apply to the nature of this component as long as it is a compound generally known as an alcohol. Like component (B), this component reacts with component (E) with the evolution of hydrogen and thus also functions as a blowing agent. Component (C) also functions to reduce the viscosity of the composition. Component (C) is specifically exemplified by n-propyl alcohol, n-butyl alcohol, 1,4-butanediol, 1,4-pentanediol, ethylene glycol, 1,3-propanediol, 1,5-hexanediol, propylene glycol, diethylene glycol, benzyl alcohol, octyl alcohol, 2-ethylhexanol, and isopropyl alcohol. The invention can use a single alcohol or mixtures of two or more different alcohols.

The platinum catalyst (D) accelerates the addition reaction between components (A) and (E) and the dehydrogenation reaction between component (E) and components (B) and (C). The subject platinum catalyst is exemplified by chloroplatinic acid, chloroplatinic acid-olefin complexes, and complexes between chloroplatinic acid and divinyltetramethyldisiloxane. Another example of component (D) is spherical microparticulate catalyst made from silicone resin that contains at least 0.01 weight % platinum catalyst as platinum metal atoms, wherein the silicone resin has a softening point of 50° C. to 200° C. and the average particle size of the spherical microparticulate catalyst is from 0.01 to 10 micrometers. The use of the described spherical microparticulate catalyst is particularly preferred because this increases the time available until the base and curing agent liquid mixture undergoes a viscosity increase and gelation.

The organohydrogensiloxane (E) is a crosslinker for component (A) and also participates in the evolution of hydrogen by its reaction with components (B) and (C). Component (E) may have a chain or cyclic structure. Component (E) is added in a quantity that affords a value from 0.5:1 to 50:1 for the ratio of the number of moles of silicon-bonded hydrogen in this component to the total of the number of moles of alkenyl in component (A) plus the number of moles of hydroxyl group in components (B) and (C).

The hollow filler (F) is filler having internal void space in which gas is enclosed. Hollow filler of this type is exemplified by inorganic hollow fillers known as glass balloons and shirasu balloons; hollow synthetic resin fillers whose outer shell is made of polystyrene, polymethyl methacrylate, polycarbonate, polyvinyl chloride, or silicone resin and in whose interior there is sealed a gas such as air, nitrogen, argon, or low-boiling hydrocarbon. Component (F) is blended into either the base or curing agent or into both. This component is blended at 5 to 50 weight parts and preferably at 10 to 30 weight parts, in each case per 100 weight parts component (A). During the operation in which the base and curing agent are mixed, component (F) is ruptured or broken open within the mixing compartment and the gas thereby released functions as a foaming aid to accelerate foaming. The gas thereby released specifically functions to make the cells uniform.

In addition to the components (A) to (F) described above, the present composition may contain optional ingredients as long as the object of the present invention is not impaired. Such optional ingredients include, but are not limited to, fillers such as fumed silica, precipitated silica, titanium dioxide, aluminum oxide, aluminum hydroxide, quartz powder, talc, crushed mineral silica, zinc oxide, calcium carbonate, and the like; fibrous fillers such as glass fibers, mineral fibers, organic fibers, and so forth; colorants such as dyes and pigments; heat stabilizers such as iron oxide red, carbon black, cerium oxide, and the like; cold-resistance improvers; adhesion promoters such as silane coupling agents; and reaction inhibitors such as methylbutynol.

The foaming/curing organopolysiloxane composition used by the present invention is prepared as a two-part foaming/curing organopolysiloxane composition, for example, by making a base by preparing a homogeneous mixture of prescribed amounts of components (A), (B), (C), and (D) or components (A), (B), (C), (D), and (F), and making a curing agent by preparing a homogeneous mixture of prescribed amounts of components (A) and (E) or components (A), (E), and (F). When the base and curing agent are mixed in prescribed proportions, this composition will simultaneously undergo foaming and curing, either at room temperature or when heated, to yield a silicone foam rubber or resin.

The preparative method according to the present invention comprises the fluid transport of the described foaming/curing organopolysiloxane composition comprising base and curing agent into a mixing device; equipped with a shear-stirring mechanism and—through the action of the said shear-stirring mechanism—the mixing therein of the base and curing agent with concomitant rupture of the hollow filler. No specific restrictions apply to the nature, etc., of the shear-stirring mechanism-equipped mixing device used for this purpose as long as it possesses a shear-stirring mechanism that is able to rupture the hollow filler used by the present invention. The subject mixing device is exemplified by a mixer that is equipped on its inner wall with a comblike array of fixed blades and is also equipped with rotating blades that rotate in an intermeshing manner with the fixed blades. The subject mixing device is also exemplified by a turbine-type mixing device equipped with a fixed stator and a rotor that rotates in the interior of the stator.

The method according to the presort invention for the preparation of silicone foams is a high-productivity method that yields silicone foam having uniform cells. These characteristic features accrue because said method comprises the fluid transport into a mixing device equipped with a shear-stirring mechanism and a discharge nozzle of both fluids of an organopolysiloxane composition comprising at least a base fluid and a curing agent fluid, wherein a gas-containing hollow filler is blended into either or both of said base and curing agent and wheezily said organopolysiloxane composition will cure and simultaneously foam when the two fluids am mixed; mixing the said base and curing agent while rupturing the said hollow filler—both through the action of the said shear-stirring mechanism—thereby releasing the gas enclosed within the hollow filler; and thereafter extruding the resulting liquidly mixture through the discharge nozzle for the development of foaming and curing.

EXAMPLES

The invention will be explained in greater detail in the following through working examples. In the examples, "parts" denotes "weight parts", cSt is an abbreviation for centistokes, and the values reported for viscosity were measured at 25° C. The device shown in FIG. 1 was used to the prepare, the silicone foams.

Example 1

A base was prepared by mixing the following to homogeneity:

100 parts dimethylvinylsiloxy-endblocked dimethylpolysiloxane (degree of polymerization (DP)=approx. 500, viscosity=15,000 cSt), 50 parts silanol-endblocked dimethylpolysiloxane (DP= 50, viscosity=100 cSt), 5 parts n-propyl alcohol, 10 parts of the reaction product of silanol-containing organopolysiloxane resin and $C_8F_{17}(CH_2)Si(CH_3)_2Cl$, 1 part chloroplatinic acid-divinyltetramethyldisiloxane complex catalyst, 15 parts shirasu balloons (product name: Winlight MSB-302 from Ijichi Kasei Kabushiki Kaisha, average particle size=60 micrometers), and 10 parts fumed silica with a specific surface area of 200 $m^2/g$.

A curing agent was prepared by mixing the following to homogeneity:

100 parts dimethylvinylsiloxy-endblocked dimethylpolysiloxane (DP=approx. 500, viscosity=15,000 cSt), 10 parts trimethylsiloxy-endblocked dimethylhydrogenpolysiloxane (DP=approx. 30), 15 parts shirasu balloons (product name: Winlight MSB-302 from Ijichi Kasei Kabushiki Kaisha, average particle size=60 micrometers), and 10 parts fumed silica with a specific surface area of 200 $m^2/g$.

The base was then placed in storage tank 5 as shown in FIG. 1, and the curing agent was placed in storage tank 6. These were separately fed in equal quantities into mixing compartment 1 by the operation of pumps 7 and 8, respectively. The rotating blades 3 were being turned at about 1,500 rpm, with the result that the base and curing agent were mixed and simultaneously therewith the shirasu balloons in the mixture were ruptured and the gas enclosed in the interior of the shirasu balloons was homogeneously dispersed into the liquid mixture. Using a nozzle 4 fixed at the bottom of the mixing compartment, the resulting liquid mixture was discharged in bead form (diameter=4 mm) onto the sealing region of a polypropylene dust cover for automotive applications. The extrudate underwent curing while foaming to produce a silicone rubber foam gasket 3 minutes later. The resulting silicone rubber foam gasket was then cut and its cross section was inspected: the cells in this foam were uniform and had diameters in the range from 10 to 100 micrometers. The foam density was 0.37 $g/cm^3$.

COMPARATIVE EXAMPLE 1

For comparison, a base and curing agent were prepared as above, with the single modification that the shirasu balloons were not added. Again operating as above a silicone rubber foam gasket was prepared from the base and curing agent. The resulting silicone rubber foam gasket was cut and its cross section was inspected: The cells in this foam were coarse and irregular. The foam density in this case was 0.45 $g/cm^3$.

Example 2

A base was prepared by mixing the following to homogeneity:

100 parts dimethylviny siloxy-endblocked dimethylpolysiloxane (degree of polymerization (DP)=approx. 500, viscosity=15,000 cSt), 50 parts silanol-endblocked dimethylpolysiloxane (DP= 50, viscosity=100 cSt), 5 parts n-propyl alcohol, 10 parts of the reaction product of silanol-containing organopolysiloxane resin and $C_8F_{17}(CH_2)Si(CH_3)_2Cl$, 10 parts of a spherical microparticulate catalyst (average particle size=1 micrometer) composed of silicone resin powder (softening point of the silicone resin=80° C.) containing a chloroplatinic acid-divinyltetramethyldisiloxane complex catalyst, 15 parts shirasu balloons (product name: Winlight MSB-302 from Ijichi Kasei Kabushiki Kaisha, average particle size=60 micrometers), and 10 parts fumed silica with a specific surface area of 200 $m^2/g$.

A curing agent was prepared by mixing the following to homogeneity:

100 parts dimethylvinylsiloxy-endblocked dimethylpolysiloxane (DP=approx. 500, viscosity=15,000 cSt), 10 parts trimethylsiloxy-endblocked dimethylhydrogenpolysiloxane (DP=approx. 30), 15 parts shirasu balloons (product name: Winlight MSB-302 from Ijichi Kasei Kabushiki Kaisha, average particle size=60 micrometers), and 10 parts fumed silica with a specific surface area of 200 $m^2/g$.

The base was then placed in storage tank 5 as shown in FIG. 1, and the curing agent was placed in storage tank 6. These were separately fed in equal quantities into mixing compartment 1 by the operation of pumps 7 and 8, respectively. The rotating blades 3 were being turned at about 1,500 rpm, with the result that the base and curing agent were mixed and simultaneously therewith the shirasu balloons in the mixture were ruptured and the gas enclosed in the interior of the shirasu balloons was homogeneously dispersed into the liquid mixture. The resulting liquid mixture was discharged through the nozzle 4 onto a polyester film; the extrudate was then overlaid with another polyester film; and this assembly was passed through a two-roll to give a 3 mm-thick sheet. Foaming and curing were induced by heating this sheet for 5 minutes in an oven at 100° C. to yield a silicone rubber foam sheet. The obtained silicone rubber foam was cut and its cross section was inspected: The cells were microfine and uniform in size. This foam had a density of 0.34 $g/cm^3$.

Example 3

A base was prepared by mixing the following to homogeneity:

100 parts dimethylvinylsiloxy-endblocked dimethylpolysiloxane (degree of polymerization (DP)=approx. 500, viscosity=15,000 cSt), 59 parts silanol-endblocked dimethylpolysiloxane (DP= 50, viscosity=100 cSt), 5 parts n-propyl alcohol, 10 parts of the reaction product of silanol-containing organopolysiloxane resin and $C_8F_{17}(CH_2)Si(CH_3)_2Cl$, 1 part chloroplatinic acid-divinyltetramethyldisiloxane complex catalyst, 15 parts hollow glass balloons (average particle size=50 micrometers), and 10 parts fumed silica with a specific surface area of 200 $m^2/g$.

A curing agent was prepared by mixing the following to homogeneity:

100 parts dimethylvinylsiloxy-endblocked dimethylpolysiloxane (DP=approx. 500, viscosity=15,000 cSt), 10 parts trimethylsiloxy-endblocked dimethylhydrogenpolysiloxane (DP=approx. 30), 15 parts shirasu balloons (product name: Winlight MSB-302 from Ijichi Kasei Kabushiki Kaisha, average particle size=60 micrometers), and 10 parts fumed silica with a specific surface area of 200 $m^2/g$.

The base was then placed in storage tank 5 as shown in FIG. 1, and the curing agent was placed in storage tank 6. These were separately fed in equal quantities into mixing compartment 1 by the operation of pumps 7 and 8, respectively. The rotating blades 3 were being turned at about 1,500 rpm, with the result that the base and curing agent were mixed and simultaneously therewith the hollow glass balloons in the mixture were ruptured and the enclosed gas was homogeneously dispersed into the liquid mixture. The resulting mixture was filled through the discharge nozzle 4 into a gap in a polypropylene article. The fill quantity was ½ the volume of the gap. The article was then heated in an oven at 100° C. for 10 minutes, as a result of which the mixture cured and foamed in the gap and the gap became entirely filled with a silicone rubber foam having uniform cells.

That which is claimed:

1. A method for preparing a silicone foam comprising the steps of:

I. transporting a base fluid and a curing agent fluid separately, in either or both which a gas-containing hollow filler is contained, into a mixing device equipped with a shear-stirring mechanism and a discharge nozzle;

II. mixing the base and the curing agent fluid together in the mixing device to produce an organosiloxane composition, and simultaneously rupturing the hollow filler using the shear-stirring mechanism to release the gas contained in the hollow filler;

III. extruding the organopolysiloxane through the discharge nozzle; and

IV. allowing the base/curing agent mixture to foam and cure.

2. The method of claim 1, wherein the organosiloxane composition comprises:

(A) 100 parts by weight of an alkenyl-substituted organopolysiloxane having a viscosity, at 25° C., of 100 to 100,000 centistokes and containing an average of at least two silicon-bonded alkenyl groups per molecule;

(B) 0 to 100 parts by weight of a silanol-containing organopolysiloxane having an average of at least one silanol group per molecule;

(C) 1 to 20 part by weight of an alcohol;

(D) a catalytic quantity of a platinum catalyst;

(E) an organohydrogenpolysiloxane containing an average of at least two silicon-bonded hydrogen atoms per molecule, wherein the ratio of the number of moles of silicon-bonded hydrogen in (E) to the total of the number of moles of alkenyl in component (A) plus the number of moles of hydroxyl group in components (B) and (C) is 0.5:1 to 50:1; and (F) 5 to 50 parts by weight of a gas-containing hollow filler having an average particle size of from 5 to 1,000 micrometers.

3. The method of claim 2, wherein the platinum catalyst comprises a silicone resin having a softening point of 50° C. to 200° C., wherein said silicone resin contains at least 0.01 weight % platinum metal atoms and wherein said platinum catalyst is a spherical microparticulate catalyst having an average particle size of from 0.01 to 10 micrometers.

* * * * *